United States Patent
Bisselink et al.

(10) Patent No.: US 9,926,634 B2
(45) Date of Patent: Mar. 27, 2018

(54) ELECTROCHEMICAL PRODUCTION OF HYDROGEN PEROXIDE

(71) Applicant: Nederlandse Organisatie voor toegepast-natuurwetenschappelijk onderzoek TNO, 's-Gravenhage (NL)

(72) Inventors: Roel Johannes Martinus Bisselink, 's-Gravenhage (NL); Joost van Erkel, 's-Gravenhage (NL)

(73) Assignee: NEDERLANDSE ORGANISATIE VOOR TOEGEPAST-NATUURWETENSCHAPPELIJK ONDERZOEK TNO (NL)

( * ) Notice: Subject to any disclaimer, the term of this patent is extended or adjusted under 35 U.S.C. 154(b) by 52 days.

(21) Appl. No.: 14/916,604

(22) PCT Filed: Sep. 4, 2014

(86) PCT No.: PCT/NL2014/050602
§ 371 (c)(1),
(2) Date: Mar. 4, 2016

(87) PCT Pub. No.: WO2015/034354
PCT Pub. Date: Mar. 12, 2015

(65) Prior Publication Data
US 2016/0222527 A1    Aug. 4, 2016

(30) Foreign Application Priority Data
Sep. 4, 2013   (EP) ..................................... 13183009

(51) Int. Cl.
C25B 1/30    (2006.01)
C25B 9/08    (2006.01)
(Continued)

(52) U.S. Cl.
CPC .............. *C25B 1/30* (2013.01); *C02F 1/4672* (2013.01); *C25B 9/08* (2013.01);
(Continued)

(58) Field of Classification Search
USPC ........................................................ 204/466
See application file for complete search history.

(56) References Cited

U.S. PATENT DOCUMENTS 4,357,217 A    11/1982   Kuehn et al.
5,358,609 A    10/1994   Drackett
(Continued)

FOREIGN PATENT DOCUMENTS

WO    2015 034 364    3/2015

*Primary Examiner* — Arun S Phasge
(74) *Attorney, Agent, or Firm* — Emerson Thomson Bennett LLC; Daniel A. Thomson (57) ABSTRACT

This invention relates to a process and reactor for the electrochemical production of hydrogen peroxide.

The process comprises producing protons at an anode, transporting produced protons through a cation exchange membrane into catholyte, producing peroxide anions in a cathode membrane assembly comprising a gas diffusion electrode and an anion exchange membrane adjoined to said gas diffusion electrode and in contact with said catholyte, which produced peroxide anions migrate at least in part into said catholyte, and combining protons and peroxide anions in said catholyte to form hydrogen peroxide.

15 Claims, 3 Drawing Sheets

(51) Int. Cl.
*C02F 1/467* (2006.01)
*C02F 1/461* (2006.01)
*C02F 103/42* (2006.01)

(52) U.S. Cl.
CPC ............... *C02F 2001/46138* (2013.01); *C02F 2103/42* (2013.01); *C02F 2201/46115* (2013.01)

(56) References Cited

U.S. PATENT DOCUMENTS

| | | |
|---|---|---|
| 5,437,771 A | 8/1995 | Shimamune et al. |
| 5,645,700 A | 7/1997 | White et al. |
| 6,387,238 B1 | 5/2002 | Merk et al. |
| 2002/0134687 A1* | 9/2002 | Nakajima ............... A61L 2/186 |
| | | 205/466 |
| 2004/0053098 A1 | 3/2004 | Schiffrin et al. |
| 2007/0012578 A1* | 1/2007 | Edvinsson Albers . C01B 15/022 |
| | | 205/466 |

* cited by examiner

ELECTROCHEMICAL PRODUCTION OF HYDROGEN PEROXIDE

This invention relates to a process and reactor for the electrochemical production of hydrogen peroxide, and to a method of treating water.

Hydrogen peroxide is a strong oxidiser with the advantage that the reaction products, water and oxygen, are environmentally harmless. Important uses of hydrogen peroxide are as bleaching agent in the paper industry and in the chemical industry as oxidation agent. Other applications include the treatment of waste water, bleaching of textiles, disinfection and recovery of metals in the mining industry.

Use of hydrogen peroxide for disinfection in swimming pools provides an attractive alternative to chlorine, for example in combination with UV treatment. For these and other applications, on-site production of hydrogen peroxide is desirable in view of the risks involved with transport, handling and storage of hydrogen peroxide solutions. It is in particular desired to avoid transport, handling and storage of highly concentrated hydrogen peroxide solutions, because such solutions are strongly oxidising, can react explosively and are liable to decompose into water and oxygen.

Currently, hydrogen peroxide is commercially often produced using the anthraquinone process. Disadvantages of this process and most other processes for the production of hydrogen peroxide include the use of hydrogen, organic solvents and other compounds which may contaminate the product. Electrochemical production of hydrogen peroxide forms an attractive prospect as it would in principle allow production of hydrogen peroxide from water and oxygen, for example from air, without using hydrogen or organic solvents. Such processes however pose numerous challenges in view of efficiency, hydrogen peroxide concentration of the product, specific energy use and stability of the electrodes.

A simple electrochemical cell is formed of two electrodes and an electrolyte. In such a non-divided electrochemical cell, the formed hydrogen peroxide can come in contact with the anode where it can be oxidised. This lowers the current efficiency and maximum concentration of hydrogen peroxide in the electrolyte. Further processing of the electrolyte is required to obtain solutions with a high concentration of hydrogen peroxide, making the process more complex and less efficient.

U.S. Pat. No. 5,437,771 discloses an electrolytic process for production of hydrogen peroxide by the use of an electrolytic cell having an anode compartment accommodating an anode and a cathode compartment accommodating a gas cathode wherein, said two compartments are separated from each other by a cation exchange membrane, and cathode compartment is divided into a solution compartment in contact with the anode compartment and a gas compartment accommodating the gas cathode by an anion exchange membrane in direct contact with the gas cathode, said process comprising the steps of: supplying said gas compartment with an oxygen-containing gas; and supplying said anode compartment with an aqueous solution of alkali hydroxide, as a result producing hydrogen peroxide in said solution compartment and oxygen in said anode compartment. U.S. Pat. No. 4,357,217 describes a process for the production of hydrogen peroxide using a three-compartment cell having an acid resistant anode, a gas-diffusion cathode, and an anion and a cation exchange membrane permeable only to anions and cations, respectively. Acid aqueous anolyte is introduced in the compartment between the anode and a first surface of the cation exchange membrane, basic aqueous catholyte is introduced in the compartment between a first surface of an anion exchange membrane and a first surface of the cathode and an aqueous solution (concentrate) is introduced in a central compartment between a second surface of the cation exchange membrane and a second surface of the anion exchange membrane. Oxygen-containing gas is introduced on a second surface of said gas-diffusion cathode and in the process reduced at the cathode to produce peroxide anions within the basic aqueous anolyte. Protons and oxygen are produced at the anode. Peroxide anions migrate through the anion exchange membrane to the central compartment and protons migrate through the cation exchange membrane to the central compartment, where they combine to form water and hydrogen peroxide. Some of the disadvantages of this process are the increased complexity of the construction and increased electrical resistance. The complexity of the process is increased by the use of three streams of electrolyte.

An objective of the present invention is to provide an electrochemical process for the production of hydrogen peroxide addressing one or more of the above mentioned disadvantages at least in part.

The inventors found that this objective can be met by using a particular configuration of an anion exchange membrane and a cathode.

Therefore, in a first aspect, the invention relates to a process for the electrochemical production of hydrogen peroxide, comprising producing protons at an anode, transporting produced protons through a cation exchange membrane into catholyte, producing peroxide anions in a cathode membrane assembly comprising a gas diffusion electrode and an anion exchange membrane adjoined to said gas diffusion electrode and in contact with said catholyte, which produced peroxide anions migrate at least in part into said catholyte, and combining protons and peroxide anions in said catholyte to form hydrogen peroxide.

In a second aspect, the invention relates to a reactor for the electrochemical production of hydrogen peroxide, comprising a cathode membrane assembly comprising an anion exchange membrane adjoined to a gas diffusion electrode, and an anode, a cation exchange membrane, and a reaction volume between said anode and said cathode membrane assembly, wherein said cation exchange membrane divides said reaction volume in a compartment for anolyte and a compartment for catholyte and said anion exchange membrane is exposed to said compartment for catholyte, or an anode membrane assembly comprising a cation exchange membrane adjoined to a second gas diffusion electrode, wherein said anode membrane assembly and cathode membrane assembly define a reaction volume and said cation exchange membrane and said anion exchange membrane are exposed to said reaction volume.

Optionally, the anode membrane assembly and cathode membrane assembly define a reaction volume by the reaction volume being located in the housing of the reactor between said anode membrane assembly and cathode membrane assembly. Often, a reaction volume is capable of receiving and/or holding a fluid medium, preferably a liquid medium, such as an aqueous solution.

This provides as advantage constructional simplicity compared to separate gas diffusion electrodes and anion exchange membranes. In addition, good current efficiency, specific energy use and high hydrogen peroxide concentration can be obtained using the process and reactor of the present invention. In a preferred process water and air are the reactants, avoiding the need for transport, handling and storage of hazardous materials compared to other process that use for instance alkaline solutions or other hazardous materials.

The term "anolyte" as used herein refers to electrolyte in a compartment comprising electrolyte in contact with an anode and/or anode membrane assembly. Reaction volumes can be divided in compartments by anion exchange membranes and/or cation exchange membranes.

The term "catholyte" as used herein refers to electrolyte in a compartment comprising electrolyte in contact with a cathode and/or cathode membrane assembly. The term "catholyte" includes electrolyte in a compartment comprising electrolyte in contact with an anode and/or anode membrane assembly and electrolyte in contact with a cathode and/or cathode membrane assembly.

The term "protons" refers to H+ and/or its forms in aqueous solutions such as $H_3O^+$. The term "peroxide anions" refers to $HO_2^-$ anions.

In the process and reactor of the invention, an anode, a cation exchange membrane and a cathode membrane assembly are involved.

The present teachings are described hereinafter with reference to the accompanying drawings.

Preferably, the anode is stable against corrosion, mechanically stable and has uniform current distribution. Preferably, the anode comprises a gas diffusion electrode. Examples of suitable gas diffusion electrodes include those exemplified for the cathode. Preferably, the anode is part of an anode membrane assembly comprising a cation exchange membrane adjoined to a second gas diffusion electrode.

Some examples of suitable anodes include dimensionally stable electrodes/anodes (DSE), for example anodes comprising an iridium oxide coating, ruthenium oxide coating or platinum oxide coating, for example on a titanium (oxide) basic element. Suitable forms for the anode are for example plate, mesh, rod, wire and ribbon.

The cation exchange membrane is selectively permeable for cations. Preferably, it comprises a polymer with fixed negatively charged groups, for example $SO_3^-$, $COO^-$, $PO_3^-$ or $HPO_3^-$. Such a cation exchange membrane selectively permits the transfer of positively charged cations, such as protons, from anolyte into catholyte.

Use of a cation exchange membrane provides the advantage that transport of negatively charged ions, such as peroxide anions, from catholyte to anode is limited, thereby reducing the oxidation of peroxide anions at the anode and increasing efficiency of the process. Suitable cation exchange membranes include those based on perfluorosulfonic acid, in particular perfluorosulfonic acid/PTFE copolymer in acid form, for example the various Nafion® membranes available from DuPont (sulfonated tetrafluoroethylene based fluoropolymer-copolymer membranes), such as N112, N115 and N117. Other suitable membranes include CM1, CM2, CMB, CMS, CMX and CMXSB available from Eurodia and/or Astom Corporation.

In the process, the anode and cathode are in electrolytic contact through an electrolyte. Accordingly, the process is carried out in an electrochemical cell and the reactor can act as an electrochemical cell.

Preferably, the cation exchange membrane divides the reaction volume in a compartment for anolyte and a compartment for catholyte. The anode is in contact with anolyte, the cathode membrane assembly is in contact with catholyte and the cation exchange membrane is at one side in contact with anolyte and with catholyte at the opposed side. The anolyte and catholyte are separated from each other at least with respect to anions. In that case, protons are transported from anolyte through a cation exchange membrane into catholyte.

As a more preferred alternative to a separate anode and cation exchange membrane, an anode membrane assembly can be used in the process and reactor. Such an anode membrane assembly comprises an anode and an adjoined cation exchange membrane, like the cathode membrane assembly described hereinafter. In that case the anode is preferably a gas diffusion electrode. Protons are produced within the anode membrane assembly and transported at least in part through the cation exchange membrane into catholyte. An advantage of using an anode membrane assembly in the process of the present invention is that only one electrolyte circuit, comprising the hydrogen peroxide product, can be used and that a single compartment reactor can be used.

The cathode membrane assembly comprises a gas diffusion electrode and an anion exchange membrane. The gas diffusion electrode and/or the anion exchange membrane preferably have a relatively small thickness compared to their length and width and preferably have a sheet-like or plate-like shape which can be for example flat, curved, rolled or tubular.

The gas diffusion electrode and anion exchange membrane are adjoined to each other. Preferably, they are attached face-to-face to each other, preferably also adjoined face-to-face to each other. Accordingly, the gas diffusion electrode and anion exchange membrane preferably both have a sheet-like or plate-like shape. Preferably, the gas diffusion electrode and anion exchange membrane are adjoined at a side surface of each, as opposed to at an edge. Preferably, the anion exchange membrane and the gas diffusion cathode are in contact, preferably in touching contact, with each other over at least 90% by area of a side of each, more preferably over 95% or more. This contact between the anion exchange membrane and the gas diffusion cathode provides the advantage that the cathode membrane assembly can act as a single structural unit of the reactor. The cathode membrane assembly accordingly preferably forms an integrated structure.

In this way, the gas diffusion electrode and anion exchange membrane are preferably stacked on each other to form a multilayer structure of generally parallel layers, one layer comprising or formed by a gas diffusion electrode and a next layer comprising or formed by an anion exchange membrane.

The anion exchange membrane preferably covers at least one surface of the gas diffusion electrode completely, such as 95-100% by area. The gas diffusion electrode is preferably not exposed to catholyte, such as less than 1% by area of the gas diffusion electrode.

The anion exchange membrane and the gas diffusion cathode can for example be clamped, pressed, adhered and/or glued to each other. The anion exchange membrane can also be directly formed on the gas diffusion electrode, for example by casting an anion exchange membrane onto a gas diffusion electrode or by incorporating anion exchange particles into a top layer of a gas diffusion electrode which faces the catholyte.

The cathode membrane assembly may comprise one or more elements that attach the anion exchange membrane and the gas diffusion electrode to each other, such as one or more clamps and/or adhesive. Another way of assuring good contact between the anion exchange membrane and the gas diffusion electrode is by applying a higher pressure at the catholyte side thus pressing the anion exchange membrane onto the gas diffusion electrode.

The cathode membrane assembly can optionally comprise a very thin liquid layer at the interface of the gas diffusion electrode and the anion exchange membrane, having a thickness of less than 0.1 mm, more preferably less than 50 µm, even more preferably less than 1 µm. Such an optional layer preferably comprises an aqueous solution of peroxide anions. The optional very thin liquid layer can also be absent.

The gas diffusion electrode (GDE) is porous and electrically conductive. In operation, the gas diffusion electrode preferably provides a conjunction of a solid, liquid and gaseous phase. Preferably the gas diffusion electrode is in liquid contact with the catholyte in the process.

The gas diffusion electrode preferably comprises carbon, a hydrophobic binder and a catalyst. The hydrophobic binder provides selective wetting of the gas diffusion electrode. A suitable hydrophobic binder is for example PTFE (polytetrafluoroethylene). Suitable catalyst materials include platinum, palladium, gold, cobalt and carbon black particles. The catalyst is preferably in the form of small particles, for example with volume average particle size smaller than 5 µm.

The gas diffusion electrode preferably comprises a current collector such as a metal mesh, for example gold-plated nickel wire mesh, stainless steel wire mesh, carbon paper or carbon fleece. The current collector preferably is positioned at the oxygen gas stream side of the gas diffusion electrode.

Other types of electrodes suitable for hydrogen peroxide production include carbon plates, optionally with an anion exchange membrane placed onto it, reticulated vitreous carbon (RVC) and carbon cloth.

The anion exchange membrane is selectively permeable for anions. Preferably, the anionic exchange membrane comprises a polymeric membrane comprising fixed positively charged groups, such as for example $RH_2N^+$, $R_2HN^+$, $R_3N^+$, $R_3P^+$, $R_2S^+$. These groups can be covalently bonded to a polymer backbone. The anionic exchange membrane is preferably base resistant. Suitable exchange groups include tetraalkyl ammonium groups with a polyolefin backbone chain.

Suitable anion exchange membranes include for example the Tokuyama AHA, ACM, ACS, AFX, AM1, AM3, AMX membrane available from Astom Corporation, Japan and Eurodia, France) and the FAA, FAB, FAD, FAS and FTAM membranes available from Fumatech. An AHA membrane, available from Eurodia and Astom, is preferred in view of its chemical stability.

Preferably, the anion exchange membrane has a selectivity of 0.9 or more, more preferably 0.95 or more, even more preferably 0.98 or more. Anion exchange membranes with such selectivity are commercially available, for example the AHA membrane available from Eurodia and Astom.

The process can be a batch process or a continuous process. The electrochemical process preferably comprises using a direct electric current (DC) to drive chemical reactions by externally applying a voltage. Preferably, the process comprises applying electric current (DC) at 100 $A/m^2$ or more, more preferably 250 $A/m^2$, even more preferably 500 $A/m^2$ or more, typically less than 4000 $A/m^2$. Such current densities were found to provide good current efficiencies (>90%) and specific energy use.

The process comprises producing protons at an anode, preferably by oxidation of water. Protons can also be produced by oxidising hydrogen. This allows for a process wherein electricity is produced and wherein hydrogen peroxide is formed in the catholyte.

The protons preferably migrate from the anode towards the cathode due to an applied electric field. The protons are preferably formed at a part of the anode in contact with anolyte, such as at a surface of the anode in contact with anolyte, preferably at a part of the anode in liquid connection with parts of the cathode.

The process comprises transporting protons through a cation exchange membrane into catholyte. Protons accordingly migrate from a side of the cation exchange membrane in contact with anolyte or an anode through the cation exchange membrane to the opposed side in contact with catholyte. Transporting protons can be implemented for example by an electric field such as by applying direct electric current to the anode and cathode. Preferably, the cation exchange membrane is positioned between the cathode membrane assembly and anode in a parallel plate configuration and/or a concentric tube configuration. Transport of protons through a membrane may involve for example diffusion, migration and surface site hopping.

The process comprises producing peroxide anions ($HO_2^-$) in the cathode membrane assembly. Peroxide anions are preferably produced by partial oxidation of oxygen ($O_2$), preferably gaseous oxygen. In the process, the gas diffusion electrode is preferably partially wetted; this provides a high specific surface area. The process preferably comprises contacting the gas diffusion electrode with oxygen, preferably gaseous oxygen and/or dissolved oxygen, for example an oxygen containing gaseous stream such as an air stream or oxygen gas. Air is a preferred oxygen containing stream.

The produced peroxide anions migrate at least partly into the catholyte. In order to allow for this, the anion exchange membrane is in contact with catholyte, preferably one side of the anion exchange membrane is in contact with catholyte over at least 90% by area of the side. Some small fraction of the peroxide anions produced within the cathode membrane assembly may react and therefore not migrate into the catholyte In the catholyte, protons and peroxide anions combine to form hydrogen peroxide. The process thus yields a solution of hydrogen peroxide. The process allows for concentrations of 20 g/l $H_2O_2$ or more to be obtained at a current efficiency of 64%. The hydrogen peroxides as product of the process can be used for example for bleaching of textile and paper pulp, for water treatment and for oxidation reactions, by contacting formed hydrogen peroxide with paper pulp, water or reactants. The hydrogen peroxide solution can be further processed for example adjusting pH, adding activators or stabilisers, distillation, purification and/or packaging.

The catholyte preferably comprises an aqueous solution comprising ionic species, such as dissolved salts, acids and/or bases, preferably with a high molar conductivity, the same applies for anolyte. The anolyte and catholyte can have the same or different chemical composition.

Preferably, the catholyte comprises an aqueous solution and has a pH of 1-11, preferably a pH of 2-8. A catholyte with acidic or neutral pH provides the advantage that hydrogen peroxide formed therein is more stable than at alkaline pH. Using a catholyte with a pH of 2-8 provides a hydrogen peroxide solution that is more suitable for transport, handling and storage and for use in water treatment.

Preferably, the catholyte comprises at least 0.01 M potassium and/or sodium ions, preferably potassium cations, preferably at least 0.1 M, more preferably at least 0.2 M, even more preferably 0.5 M or 1 M, for example preferably at least 0.1 M potassium cations, typically at most 5 M. Such amounts of potassium and/or sodium ions in the catholyte were found to improve electrode kinetics of the gas diffusion electrode over a broad pH range (pH 1-13). Without wishing to be bound by way of theory, it is believed that adsorption of sodium and/or potassium ions has a catalytic effect on the cathode membrane assembly.

Preferably, the amount of catholyte in the electrochemical cell is no more than 20 l catholyte per $m^2$ of anion exchange membrane, preferably 10 l or less, more preferably 5 l catholyte per $m^2$ of anion exchange membrane or less, typically more than 0.2 l catholyte per $m^2$ of anion exchange membrane. A smaller catholyte volume provides reduced specific energy usage.

Preferably, the anolyte has a pH of 6 or less, preferably a pH of 2 or less. This provides lower resistance of the anolyte and thus reduced specific energy usage.

Preferably, the amount of anolyte in the electrochemical cell is 20 l anolyte per $m^2$ of anode or less, preferably 10 l or less, more preferably 5 l anolyte per $m^2$ of anode or less, typically more than 0.2 l anolyte per $m^2$ of anode. A smaller anolyte volume provides a lower resistance and thus reduced specific energy use.

The process can involve water transport through the anion exchange membrane. The cathode membrane assembly optionally advantageously allows the net water transport through the anion exchange membrane to be from catholyte to gas diffusion electrode or to be zero (no net water transport through the anion exchange membrane). Zero net water transport through the anion exchange membrane can advantageously allow for higher concentrations of hydrogen peroxide. Preferably, the gas diffusion electrode in the cathode membrane assembly is contacted with a dry gas stream comprising oxygen. This can provide the advantage that it allows the net water transport through the anion exchange membrane to be from catholyte to gas diffusion electrode. The optional very thin liquid layer in the cathode membrane assembly can contribute to such net water transport, as a preferred high osmotic pressure of such a very thin liquid layer can compensate water transport due to electro-osmotic drag of peroxide anions. The reactor can comprise a cathode membrane assembly comprising an anion exchange membrane adjoined to a gas diffusion electrode, and an anode, a cation exchange membrane, and a reaction volume between said anode and said cathode membrane assembly, wherein said cation exchange membrane divides said reaction volume in a compartment for anolyte and a compartment for catholyte and said anion exchange membrane is exposed to said compartment for catholyte. Said gas diffusion electrode comprised in said cathode membrane assembly acts as cathode.

The reactor can also comprise an anode membrane assembly. In that case, the reactor can comprise an anode membrane assembly comprising a cation exchange membrane adjoined to a second gas diffusion electrode wherein said anode membrane assembly and cathode membrane assembly define a reaction volume and said cation exchange membrane and said anion exchange membrane are exposed to said reaction volume. Said second gas diffusion electrode acts as anode.

A preferred reactor suitable for a process according to the invention, comprises a cathode membrane assembly comprising an anion exchange membrane adjoined to a (first) gas diffusion electrode, and an anode membrane assembly comprising a cation exchange membrane adjoined to a second gas diffusion electrode, preferably different from said first gas diffusion electrode, wherein said anode membrane assembly and cathode membrane assembly define a reaction volume and said cation exchange membrane and said anion exchange membrane are exposed to said reaction volume. In operation, the second gas diffusion electrode may be an anode.

The reactor in addition preferably comprises a compartment for receiving gas (gas compartment) with an inlet and/or an outlet for a gas, suitable for supply and/or exhaust of a gas. The second gas diffusion electrode (anode) is preferably at least partly exposed to said gas compartment.

A preferred method of the invention is carried out in such a preferred reactor comprising both a cathode membrane assembly and an anode membrane assembly. Preferred processes and reactors involving an anode membrane assembly advantageously allow oxygen gas, for instance as oxygen enriched gaseous stream, to be obtained, for instance in an exhaust compartment, and/or may allow hydrogen gas to be used as supply gas. In addition, the process and reactor can provide high energy efficiency and high production rates, a stable and reliable production and low maintenance. Use of alkali chemicals can be avoided, which is especially attractive for local production of hydrogen peroxide, such as for disinfection, and may reduce corrosion. Oxygen gas recovered from the anode is optionally supplied to the cathode.

A preferred process for electrochemical production of hydrogen peroxide comprises
  producing protons in a an anode membrane assembly comprising a cation exchange membrane adjoined to a second gas diffusion electrode, preferably from water and/or hydrogen, wherein said cation exchange membrane is in contact with a fluid medium,
  producing peroxide anions in a cathode membrane assembly comprising a first gas diffusion electrode and an anion exchange membrane adjoined to said gas diffusion electrode and in contact with said fluid medium, preferably from oxygen gas in contact with said first gas diffusion electrode,
  and combining protons and peroxide anions in said fluid medium to form hydrogen peroxide, wherein said fluid medium is preferably liquid, more preferably an aqueous solution, for example catholyte.

Preferably, said process involves supplying water and/or hydrogen gas to anode and supplying oxygen gas to the cathode, and supplying an appropriate electric current to the cathode and anode.

The reactor preferably comprises a housing for the anode or anode membrane assembly, cathode membrane assembly and cation exchange membrane, defining a reaction volume. The housing preferably comprises positioning elements for keeping in place the cathode membrane assembly, and for keeping in place the cation exchange membrane and the anode or the anode membrane assembly. Gaskets can be located between the anode or anode membrane assembly, cation exchange membrane and/or cathode membrane assembly. The anode or anode membrane assembly and the cathode membrane assembly are spatially separated from each other. A cation exchange membrane is preferably positioned between the anode and the cathode membrane assembly and preferably spaced apart from both. The process of the present invention preferably comprises using such a reactor.

Preferably, the anode or anode membrane assembly, cathode membrane assembly and cation exchange membrane are in parallel plane configuration. The reactor can also have a spiral-wound configuration. Reactors and processes of the present invention are suitable for small scale production, such as on-site, of hydrogen peroxide (up to 1 kg/h) as well for large scale production (for example 1 to 500 thousand tonnes per year or even higher).

The reactor preferably comprises an electric power source connected to the anode and cathode to apply a voltage. The reactor preferably comprises an inlet and an outlet for catholyte and preferably also for anolyte and/or for a fluid medium; preferably in a part of the housing forming a wall of a reaction volume. The reactor in addition preferably comprises a supply compartment with an inlet and optionally an outlet for an oxygen-containing stream, such as an air stream. The gas diffusion electrode is preferably at least partly exposed to the supply compartment. In this way, gaseous oxygen can be supplied to the gas diffusion electrode. The reactor optionally comprises spacers and/or support for the various membranes. The reactor may comprise a plurality of anodes or anode membrane assemblies, cathode membrane assemblies and/or cation exchange membranes. The reactor may further comprise additional membranes between the anode and cation exchange membrane and/or between the cation exchange membrane and cathode membrane assembly, in this way a compartment for anolyte and/or catholyte can be divided partly or completely in further compartments. Preferably, the compartments are filled with anolyte, respectively catholyte in operation of the reactor.

Figure 1:
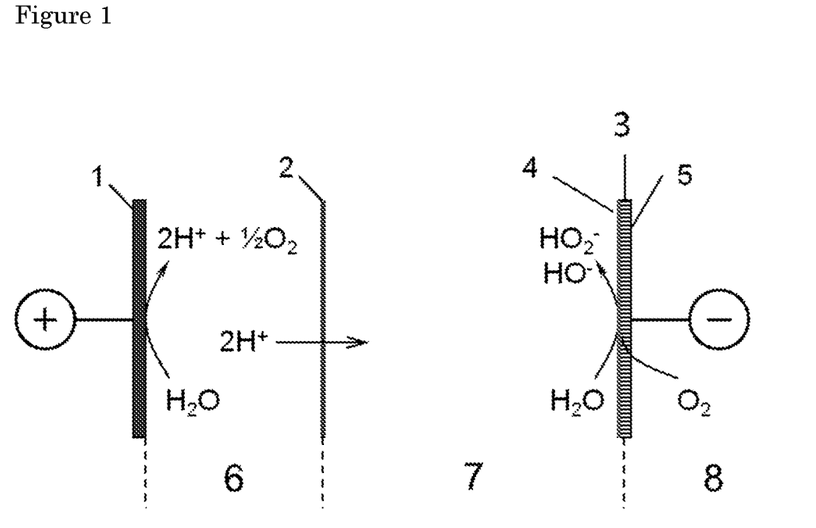
FIG. 1 schematically illustrates an exemplary embodiment of the invention.

FIG. 1 schematically illustrates an exemplary embodiment of the invention. Water in anolyte 6 is oxidised at anode 1. Protons pass through the cation exchange membrane 2 (CEM) from anolyte 1 into catholyte 7. The cathode membrane assembly 3 comprises an anion exchange membrane 4 (AEM) and a gas diffusion electrode 5 as cathode. Oxygen gas in supply compartment 8 is reduced to $HO_2^-$ and $OH^-$ in the cathode membrane assembly 3. $H^+$ cations and $HO_2^-$ anions in catholyte 7 combine to form $H_2O_2$. Alternatively, $H^+$ and $O_2$ can be reduced at the cathode membrane assembly to $HO_2^-$.

Figure 2:
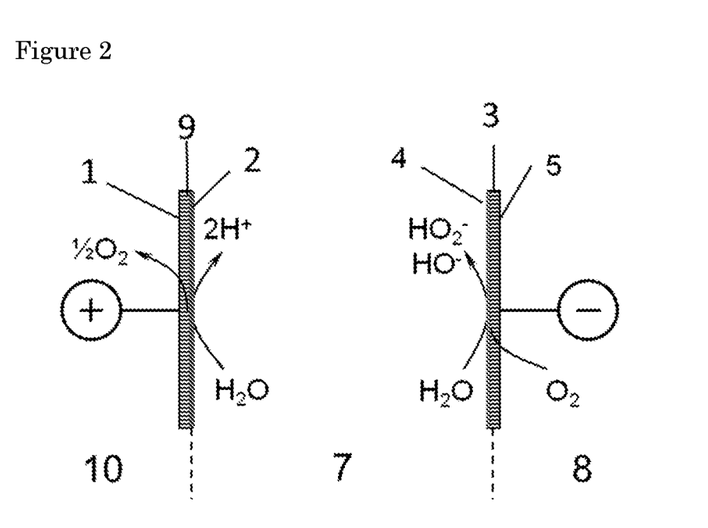
FIG. 2 schematically illustrates another exemplary embodiment of the invention.

FIG. 2 schematically illustrates another exemplary embodiment of the invention. Water in catholyte 7 is oxidised in anode membrane assembly 9 comprising anode 1 and cation exchange membrane 2, yielding protons in catholyte 7 and oxygen gas in exhaust compartment 10. Oxygen gas in supply compartment 8 is reduced to $HO_2^-$ and $OH^-$ in cathode membrane assembly 3. $H^+$ cations and $HO_2^-$ anions in catholyte 7 combine to form $H_2O_2$.

Figure 3:
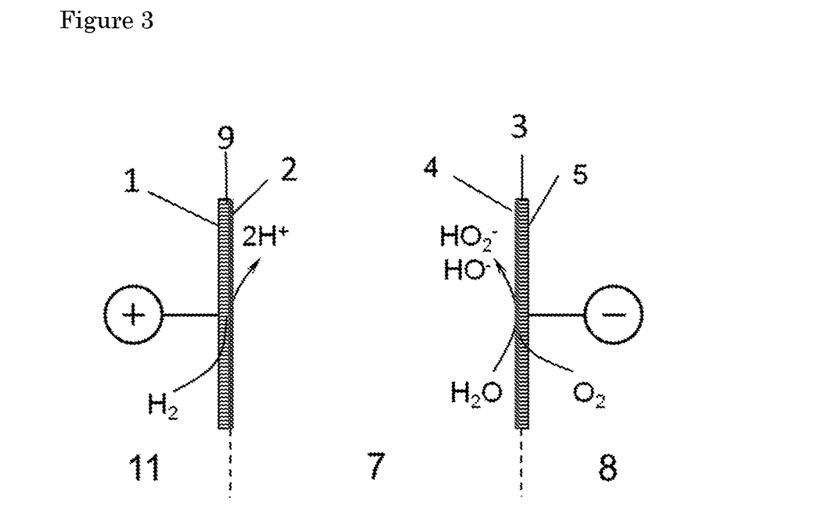
FIG. 3 schematically illustrates yet another exemplary embodiment of the invention.

FIG. 3 schematically illustrates yet another exemplary embodiment of the invention. Hydrogen gas in supply compartment 11 is oxidized in anode membrane assembly 9 comprising anode 1 and cation exchange membrane 2, yielding protons in the catholyte 7. Oxygen gas in supply compartment 8 is reduced to $HO_2^-$ and $OH^-$ in cathode membrane assembly 3. $H^+$ cations and $HO_2^-$ anions in catholyte 7 combine to form $H_2O_2$.

The formed hydrogen peroxide can be used in a method of treating fluids such as water, including sprays, aerosols, solutions, suspensions, liquids, foams and emulsions, preferably fluids to which humans, animals, plants, and/or living materials such as cells, tissues and organs, are contacted or exposed, for example swimming pool water, water for showers, baths, toilets, whirlpools, saunas, the method comprising electrochemically producing hydrogen peroxide as described, preferably using a reactor as described, and adding produced hydrogen peroxide to water to be treated, and optionally supplying disinfected and/or treated water to the location of use, such as the location where it is contacted or exposed to humans and/or animals, for instance to a swimming pool. This method can also be used for disinfection of objects and surfaces. The fluid to be treated is preferably aqueous.

The treatment, such as water treatment, may comprise disinfection, such as deactivating and/or killing microorganisms and pathogens and reducing or inhibiting micro-organism growth, for example bacterial growth. This is in particular important for swimming pool water. The treatment may also comprise reducing the concentration of contaminants in the water, fluid, object or on the surface, such as by oxidising the contaminants, such as halogenated compounds and hydrofluorocarbon compounds, in particular in waste water streams.

Preferably, the method of treating water is for disinfecting swimming pool water and/or preventing or reducing bacterial growth therein. Preferably the method comprises on-site producing hydrogen peroxide as described and adding produced hydrogen peroxide to the object, surface or fluid to be treated, for example swimming pool water to be treated. On site may for instance refer to production within 100 m or less, such as 50 m or less, or 10 m or less of the place of use. Optionally, the process comprises just-in-time and/or on-demand production of hydrogen peroxide.

On-site hydrogen peroxide production comprises for example producing hydrogen peroxide on the site where it is used, for example in the same building, and can also referred to as in situ production. As electrochemically producing hydrogen peroxide according to the process requires only water, air and electricity, it is a sustainable solution for swimming pool water maintenance and other treatments by avoiding use of hazardous materials, for instance alkaline solutions, chlorine, hydrogen and/or hazardous solvents such as organic solvents.

The on-site production of hydrogen peroxide preferably allows the produced hydrogen peroxide to be added to the object, surface and/or fluid, such as swimming pool water, to be treated through one or more fluid conduits. For example, a stream of fluid to be treated, such as swimming pool water to be treated, can be passed through a compartment comprising electrolyte and/or wherein hydrogen peroxide is formed. That compartment can also be in liquid contact with fluid to be treated such as swimming pool water to be treated. In this way, transport and storage of packaged hydrogen peroxide and the risk associated therewith can be avoided.

In addition, the process for the electrochemical production of hydrogen peroxide allows for the just-in-time or real-time production of hydrogen peroxide in amounts required at any moment, for example by adjusting (increasing or decreasing) the electric current applied. This is especially useful if the process is part of the method for treating an object, surface, or fluid. The dosing of hydrogen peroxide can be varied as required by adjusting the applied electric current. The method and/or the process can further comprise determining the required amount of hydrogen peroxide at regular intervals, such as every 30 minutes or more frequently, or more frequently than every hour, every six hours, or every day, weekly or monthly, or more frequently than each of these, or even less frequently than monthly, for instance by measuring the bacterial load and or load of other pathogens, in case of disinfection, and/or for example by determining the number of swimmers in the swimming pool.

Preferably, the produced hydrogen peroxide is immediately used and/or discharged into a fluid to be treated or supplied to the surface and/or object to be treated, such as water, for instance within 1 hour, or within 10 minutes, or even within 1 minute. Preferably, the reactor comprises less than 10 L, or less than 1 L, or less than 100 mL of hydrogen peroxide containing solution.

Avoiding storage provides reduces risks and higher efficiency in view of the instability and spontaneous decomposition of hydrogen peroxide solutions. Avoiding transport of packaged hydrogen peroxide solutions provides benefits of reduced risks associated with in particular road transport and transferring hydrogen peroxide from transport package into the disinfection installation of a swimming pool. The method can further comprise UV-light exposure and activation of the hydrogen peroxide by a catalyst e.g. transition metal catalyst. UV-light exposure is preferred in view of avoiding contamination.

The invention will now be further elucidated by the following non-limiting examples.

EXAMPLE 1

In this experiment, an iridium oxide coated titanium plate was used as anode supplied by Magneto Special Anodes B.V., the Netherlands) and a DuPont Nafion 117 membrane as cation exchange membrane. A Tokuyama AHA anion exchange membrane pressed to a gas diffusion electrode supplied by Gaskatel GmbH, Germany, was used as cathode membrane assembly. The effective electrode and membrane area was 10×10 cm, the distance between the anode and the cation exchange membrane was 8 mm and the distance between the cation exchange membrane and the cathode membrane assembly was also 8 mm. 1 liter 0.5 M $K_2SO_4$ was used as catholyte and 1 liter 0.1 M $H_2SO_4$ was used as anolyte. The applied current was initially 100 A/m², after 2 hours it was increased to 250 A/m² and after an additional to 2 hours further to 500 A/m².

Figure 4:
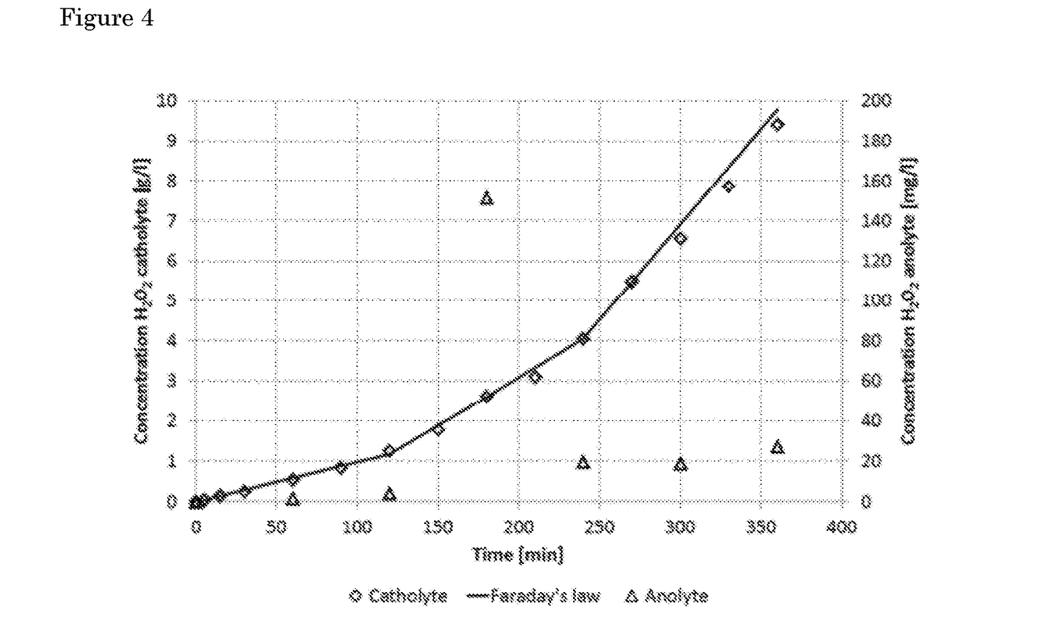
FIG. 4 shows a chart showing the increase in hydrogen peroxide concentration in time approximately to Faraday's law.

The concentration hydrogen peroxide increased in time approximately to Faraday's law, see FIG. 4. A slight concentration increase of $H_2O_2$ in the anolyte was observed (the high concentration at t=180 min is assumed to be erroneous). Current efficiency and specific energy use are given in table 1.

TABLE 1

| Current (A/m²) | Current efficiency (%) | Specific energy use (kWh/kg $H_2O_2$) |
|---|---|---|
| 100 | 101 | 4.3 |
| 250 | 96 | 6.1 |
| 500 | 91 | 9.0 |

EXAMPLE 2

Figure 5:
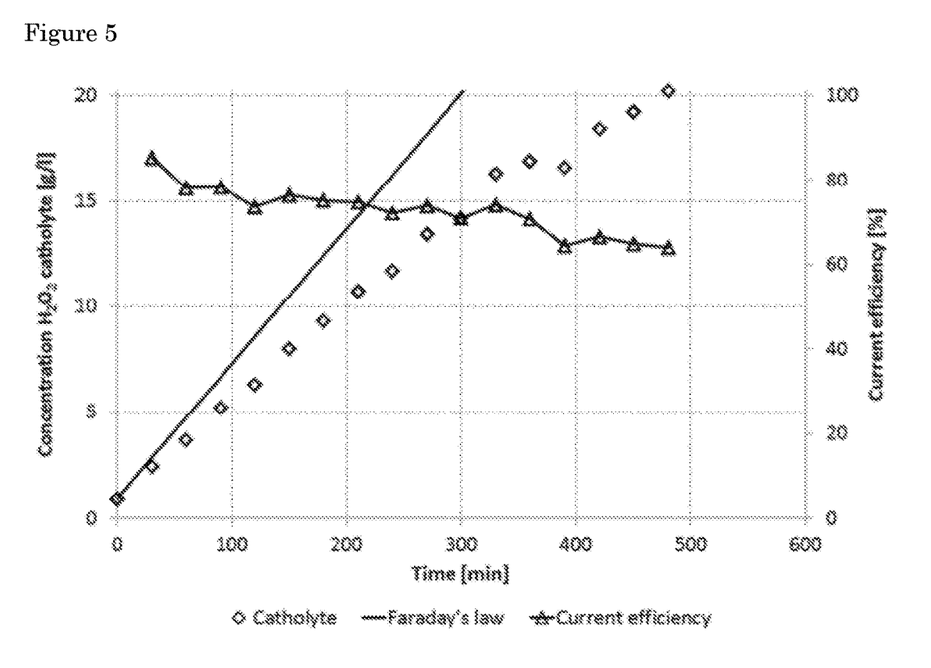
FIG. 5 shows a chart showing the concentration of $H_2O_2$ in the catholyte.

To increase the hydrogen peroxide concentration, 0.8 liter 0.6 M $K_2SO_4$ was used as catholyte and 1 liter 0.2 M $H_2SO_4$ was used as anolyte at 500 A/m². The concentration $H_2O_2$ in the catholyte and the current efficiency are shown in FIG. 5. The current efficiency was initially 85% and decreased to 64%. The specific energy use was 10 kWh/kg $H_2O_2$. A 20 g/l $H_2O_2$ was obtained.

The invention claimed is:

1. Process for the electrochemical production of hydrogen peroxide, comprising producing protons at an anode, transporting produced protons through a cation exchange membrane into catholyte, producing peroxide anions in a cathode membrane assembly comprising a first gas diffusion electrode and an anion exchange membrane adjoined to said first gas diffusion electrode, wherein said first gas diffusion electrode provides a cathode, and in contact with said catholyte, which produced peroxide anions migrate at least in part into said catholyte, and combining protons and peroxide anions in said catholyte to form hydrogen peroxide, wherein there is a reaction volume between said anode and said cathode membrane assembly, wherein said cation exchange membrane divides said reaction volume in a compartment for anolyte and a compartment for catholyte, wherein a second gas diffusion electrode provides an anode, and said anion exchange membrane is exposed to said compartment for catholyte, wherein an anode membrane assembly comprises a cation exchange membrane adjoined to said second gas diffusion electrode, wherein said anode membrane assembly and cathode membrane assembly define a reaction volume and wherein said cation exchange membrane and said anion exchange membrane are exposed to said reaction volume.

2. Process according to claim 1, wherein said catholyte comprises an aqueous solution and has a pH of 2-8.

3. Process according to claim 1, wherein said catholyte comprises at least 0.01 M potassium ions, at least 0.01M sodium ions, or at least 0.01M combined potassium and sodium ions.

4. Process according to claim 1, wherein the process is carried out in an electrochemical cell and wherein the amount of catholyte within the electrochemical cell is no more than 200 liter catholyte per m² of anion exchange membrane.

5. Process according to claim 1, wherein said anode and said cation exchange membrane are in contact with anolyte and wherein said anolyte has a pH of 6 or less.

6. Reactor for a process according to claim 1, comprising:
   a cathode membrane assembly comprising an anion exchange membrane adjoined to a first gas diffusion electrode, wherein said first gas diffusion electrode is a cathode; and
   an anode membrane assembly comprising a cation exchange membrane adjoined to a second gas diffusion electrode, wherein said second gas diffusion electrode is an anode, wherein said anode membrane assembly and cathode membrane assembly define a reaction volume and said cation exchange membrane and said anion exchange membrane are exposed to said reaction volume.

7. Reactor according to claim 6, wherein said gas diffusion electrode and said anion exchange membrane are attached face-to-face to each other.

8. Reactor according to claim 6, wherein the anion exchange membrane and the gas diffusion electrode are in contact with each other over at least 90% by area of a side of each.

9. Reactor according to claim 6, comprising an anode membrane assembly, wherein said gas diffusion electrode and said anion exchange membrane are attached face-to-face to each other.

10. Process according to claim 1, wherein said process is carried out in a reactor comprising a cathode membrane assembly comprising an anion exchange membrane adjoined to a gas diffusion electrode, and an anode membrane assembly comprising a cation exchange membrane adjoined to a second gas diffusion electrode, wherein said anode membrane assembly and cathode membrane assembly define a reaction volume and said cation exchange membrane and said anion exchange membrane are exposed to said reaction volume.

11. Process according to claim 10, for the electrochemical production of hydrogen peroxide, carried out in a reactor comprising
   a cathode membrane assembly comprising an anion exchange membrane adjoined to a first gas diffusion electrode, and
   an anode membrane assembly comprising a cation exchange membrane adjoined to a second gas diffusion electrode, and
   a reaction volume between said anode membrane assembly and cathode membrane assembly and said cation exchange membrane and said anion exchange membrane are exposed to said reaction volume,
the process comprising
   producing protons at said second gas diffusion electrode as anode, transporting produced protons through said cation exchange membrane into catholyte,
   producing peroxide anions in said cathode membrane assembly, which produced peroxide anions migrate at least in part into said catholyte,
   and combining protons and peroxide anions in said catholyte to form hydrogen peroxide.

12. Method of treating an object, surface, or fluid, comprising electrochemically producing hydrogen peroxide according to the process of claim 1 and adding produced hydrogen peroxide to an object, surface, or fluid, to be treated.

13. Method of treating an object, surface, or fluid, according to claim 12 using a reactor comprising a cathode membrane assembly comprising an anion exchange membrane adjoined to a gas diffusion electrode, and an anode, and a cation exchange membrane, and a reaction volume between said anode and said cathode membrane assembly, wherein said cation exchange membrane divides said reaction volume in a compartment for anolyte and a compartment for catholyte and said anion exchange membrane is exposed to said compartment for catholyte.

14. Method according to claim 12, for disinfecting swimming pool water and/or preventing or reducing bacterial growth therein, comprising the steps of:
   producing hydrogen peroxide on site by the steps of:
      producing protons at an anode;
      transporting produced protons through a cation exchange membrane into catholyte;
      producing peroxide anions in a cathode membrane assembly comprising a gas diffusion electrode and an anion exchange membrane adjoined to said gas diffusion electrode and in contact with said catholyte, which produced peroxide anions migrate at least in part into said catholyte; and
      combining protons and peroxide anions in said catholyte to form hydrogen peroxide; and,
      adding produced hydrogen peroxide to swimming pool water to be treated.

15. The method according to claim 14 for disinfecting swimming pool water, wherein the hydrogen peroxide is produced in the same location as the hydrogen peroxide is added.

* * * * *